(12) United States Patent
Mims

(10) Patent No.: US 7,295,859 B2
(45) Date of Patent: Nov. 13, 2007

(54) RADIO FREQUENCY (RF) PROTOCOL MODULE SYSTEM AND METHOD

(75) Inventor: Victor Mims, 15313 SW. 107th Ct., Miami, FL (US) 33157

(73) Assignee: Victor Mims, Miami, FL (US)

( * ) Notice: Subject to any disclaimer, the term of this patent is extended or adjusted under 35 U.S.C. 154(b) by 0 days.

(21) Appl. No.: 10/793,451

(22) Filed: Mar. 4, 2004

(65) Prior Publication Data

US 2005/0197152 A1    Sep. 8, 2005

(51) Int. Cl.
*H04M 1/00* (2006.01)

(52) U.S. Cl. ............... 455/552.1; 455/550.1; 455/553; 455/558

(58) Field of Classification Search ......... 455/558, 455/559, 552.1, 553.1, 550.1, 575.1; 370/522
See application file for complete search history.

(56) References Cited

U.S. PATENT DOCUMENTS

| | | | | |
|---|---|---|---|---|
| 5,535,434 A | * | 7/1996 | Siddoway et al. | 455/575.1 |
| 5,894,597 A | * | 4/1999 | Schwartz et al. | 455/558 |
| 6,097,950 A | * | 8/2000 | Bertacchi | 455/432.2 |
| 6,108,562 A | * | 8/2000 | Rydbeck et al. | 455/552.1 |
| 6,141,547 A | * | 10/2000 | Rousseau et al. | 455/426.1 |
| 6,324,405 B1 | * | 11/2001 | Young et al. | 455/456.1 |
| 6,557,753 B1 | * | 5/2003 | Beaujard et al. | 235/375 |
| 6,571,112 B1 | * | 5/2003 | Ramaswamy | 455/466 |
| 6,755,343 B1 | * | 6/2004 | Cheng et al. | 235/380 |
| 6,766,177 B2 | * | 7/2004 | Chambon et al. | 455/550.1 |
| 6,865,401 B2 | * | 3/2005 | Kotzin | 455/557 |
| 7,024,224 B2 | * | 4/2006 | Kuehnel et al. | 455/557 |
| 7,043,238 B2 | * | 5/2006 | Ahn et al. | 455/432.1 |
| 2002/0061745 A1 | * | 5/2002 | Ahn et al. | 455/432 |
| 2003/0148791 A1 | * | 8/2003 | Ahn et al. | 455/559 |
| 2003/0199282 A1 | * | 10/2003 | Marcjan et al. | 455/466 |

* cited by examiner

*Primary Examiner*—Tilahun B. Gesessse
(74) *Attorney, Agent, or Firm*—The Law Firm of H. Dale Langley, Jr., PC

(57) ABSTRACT

A system for mobile communications includes a protocol module and a radio component. The radio component includes a socket for electrically connecting to the protocol module and the protocol module is replaceable. The protocol module operates to provide functionality to the system according to at least one communications technology. The communications technologies can include any of CDMA, TDMA, GSM, or others. The protocol module can be replaced, for example, a protocol module for CDMA communications can be used where CDMA communications are possible and a separate protocol module for GSM communications can be used where GSM communications are possible. Because the protocol module is replaceable, any communications protocols and technologies, current and future, are viable for operations of the radio component, merely by replaced with an appropriate protocol module for the particular communications protocols and technologies at the location.

22 Claims, 5 Drawing Sheets

RADIO FREQUENCY (RF) PROTOCOL MODULE SYSTEM AND METHOD

BACKGROUND OF THE INVENTION

The present invention generally relates to wireless telephones and similar communications devices and, more particularly, relates to modular protocol units for radio frequency communications systems, such as cellular telephone and similar wireless communications devices, operable according to various and varied protocols and communications technologies of such systems, including GSM, CDMA and TDMA.

A variety of technologies and protocols are in use in mobile communications, such as in cellular and other wireless communications systems. The technologies typically vary according to geographic locale. In the U.S, for example, mobile communications typically operate according to a multiplexing protocol, such as Time-Division Multiple Access (TDMA) or more predominantly at present, Code-Division Multiple Access (CDMA). In Europe and other parts of the world, mobile communications systems typically operate according to Global System for Mobile communication (GSM).

Over time, other protocols and technologies have been employed in radio frequency (RF) communications, including those in mobile communications systems. Future and modified technologies and protocols in mobile communications systems can be expected. Because of these frequent modifications and progressions in mobile communications systems technologies and protocols, equipment and functionality of devices, systems and methods for particular technologies and protocols become quickly outdated and obsolete.

In virtually all mobile technology systems, certain elements of devices and methods in the systems remain relatively constant; whereas, other elements of devices and methods tend to be replaced and changed. For example, all mobile devices require antenna and radio equipment. However, mobile devices differ in the equipment required to conform to the applicable technologies and protocols employed in the relevant mobile communications system environment, including, for example, each device must have appropriate features, functionality, and equipment necessary to operate according to the applicable protocols (e.g., either CDMA, GSM or other).

Certain efforts in the industry have been directed to attempting to incorporate multiple operational elements to conform to more than one of the applicable protocols (e.g., certain devices may operate in both CDMA and GSM systems). However, such devices are typically more costly and cumbersome. In any event, the devices do not contemplate new or changed protocols that may become prevalent in the future. Also, the devices do not necessarily incorporate vehicles for operations in all of the possible mobile communications systems that are presently in operation in various locales.

It would be a significant improvement and advance in the technology and art to provide for operations of mobile devices in multiple communications systems, irrespective of particular protocols and technologies. Moreover, it would be a significant improvement and advance to remedy the obsolescence that is typical in the devices. The present invention solves the problems exhibited by the conventional technology, including by allowing update and modification of conventional elements of mobile devices to conform to pluralities of and new and future technologies and protocols, such as through interchangeable modular systems for the mobile communications devices.

SUMMARY OF THE INVENTION

An embodiment of the invention is a system for mobile communications. The system includes a protocol module and a radio component. The radio component includes a socket for electrically connecting to the protocol module and the protocol module is replaceable.

Another embodiment of the invention is a mobile communications device. The device includes a self-contained, modular unit for operating the mobile communications device in accordance with a communications protocol and a radio connected to the modular unit for transmitting and receiving communications.

Yet another embodiment of the invention is a protocol module. The module is for use with a communications device that has a radio. The module includes at least one connector for electrically connecting the protocol module to the radio. The protocol module provides particular functionality to enable the radio to operate in at least one communications system.

Another embodiment of the invention is a method of mobile communications. The method includes selecting a communications protocol for a mobile communications device via a module of the device.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
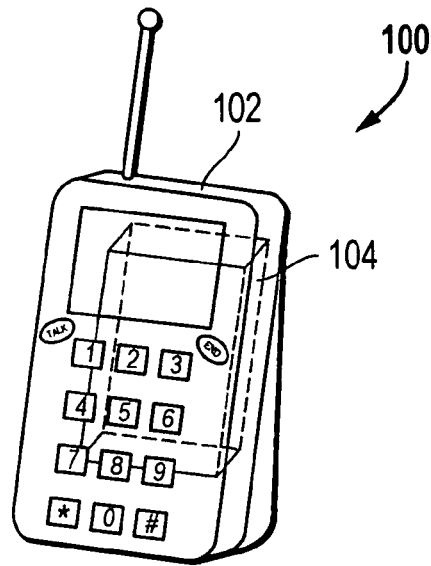
FIG. 1 illustrates a front, perspective view of a mobile communications device, including a radio component and a protocol module, such as a module providing either GSM, CDMA or other communications technologies operations and functions, according to certain embodiments of the invention.

Referring to FIG. 1, a mobile communications device 100 includes a radio component 102 and a protocol module 104. The radio component 102 includes substantially conventional radio elements for transmission and reception of wireless signals, as well as display, user-input elements (e.g, keyboard with numbers/alpha-numeric keys and transmit/receive and off/on buttons), power and similar components. The radio component 102 also includes encasing of circuitry providing the foregoing conventional functional elements and an external antenna. The radio component 102 is substantially a conventional mobile communications device, but without any particular protocol logic and circuitry for any specific type of communications technology (e.g., CDMA or GSM). As will be detailed, however, the radio component 102, on a back side thereof (not shown in detail in FIG. 1), includes a suitable socket for the protocol module.

The protocol module 104 is a self-contained modular unit that is locatable in the socket on the back of the radio component 102. The protocol module 104, when located in the socket of the radio component 102, provides appropriate protocol functionality (e.g., for CDMA, GSM or another mobile communications system technology), to enable operations of the mobile communications device 100 in transmitting and receiving communications over the applicable communications system in accordance with the system technology and protocols. The protocol module 104 includes logic circuitry for operations of the device 100 according to an applicable communications technology and protocol, based on the particular protocol module 104 then being used in the device 100. For example, one embodiment of the protocol module 104 can operate according to CDMA technology, whereas a separate other embodiment of the protocol module 104 can operate according to GSM technology. The particular logic circuitry of the protocol module 104 dictates the compatibility and use for the particular communications technology then available via the locally or otherwise situated mobile communications system. Of course, the protocol module 104 can embody logic circuitry for any other communications technology, now or in the future available or desired.

Figure 2:
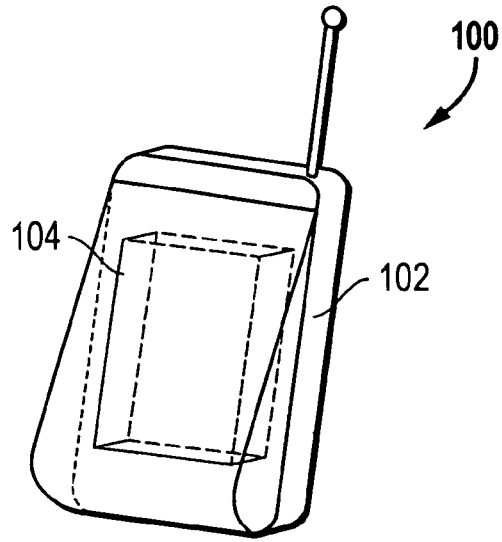
FIG. 2 illustrates a back, perspective view of the mobile communications device of FIG. 1, showing the protocol module in place in a socket of the radio component, according to certain embodiments of the invention.

Referring to FIG. 2, a back-side of the mobile communications device 100 of FIG. 1 includes the protocol module 104 located in the socket of the radio component 102.

Figure 3:
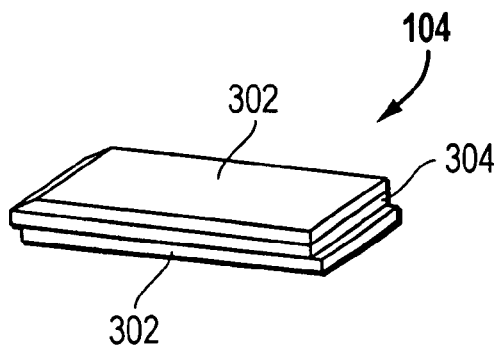
FIG. 3 illustrates a perspective view of a protocol module, for providing particular communications technology and protocol functionality, according to certain embodiments of the invention.

Referring to FIG. 3, an exemplary embodiment of the protocol module 100, illustrated in simplified view for purposes of discussion, includes a housing 302. The housing 302 is connected to a circuit board 304, and encased the circuit board 304. The housing 302 is plastic or some other non-conductive and protective material, primarily for shielding the rest of the protocol module 100 from external effects. The circuit board 304, as previously mentioned, is formed with logic and other circuitry suitable to provide functionality and operations according to a particular communications technology protocol (e.g., either CDMA or GSM). The circuit board 304 also includes electrical connections for communicative electrical connections of the circuit board 304 to the radio component 102 (shown in FIGS. 1 and 2) via the socket of the radio component 102. As hereinafter further discussed, the circuit board 304 includes cut-outs or other access therethrough or therearound, so that the circuit board 304 can electrically connect to the radio component 102 for providing the particular protocol functionality to the device 100.

Figure 4:
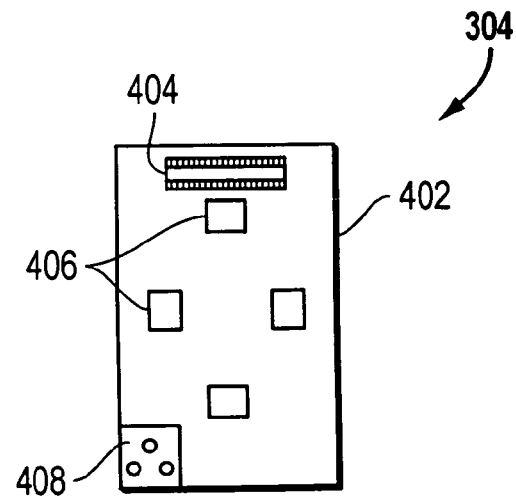
FIG. 4 illustrates a circuit board of a protocol module, which circuit board provides functional elements and components required for operations according to particular communications technology and protocols, such as, for example, CDMA or GSM, according to certain embodiments of the invention.

Referring to FIG. 4, the circuit board 304 of the protocol module 104 of FIG. 3 includes a printed circuit board (PCB) 402, having appropriate logic circuitry to perform operations for the device 100 according to a particular communications technology (e.g., either CDMA or GSM). The PCB 402 also incorporates various elements for connectivity and grounding, corresponding to similar elements and connections of the radio component 102. Particularly, the PCB 402 includes an electrical connector 404 suitable for connection to corresponding features of the radio component 102, for example, the connector 404 is a 60 or 100 pin connector. The PCB 402 also includes one or more protruding ground probes 406. The ground probes 406, and their facilitation, are hereafter described in further detail, however, generally the ground probes 406 provide grounding connectivity for the PCB 402. The PCB 402 also includes an attached antenna connection 408, providing for electrical contact with an antenna of the radio component 102 and dual grounds thereof. The antenna connection 408 has special features and design, and is later described more fully.

Figure 5:
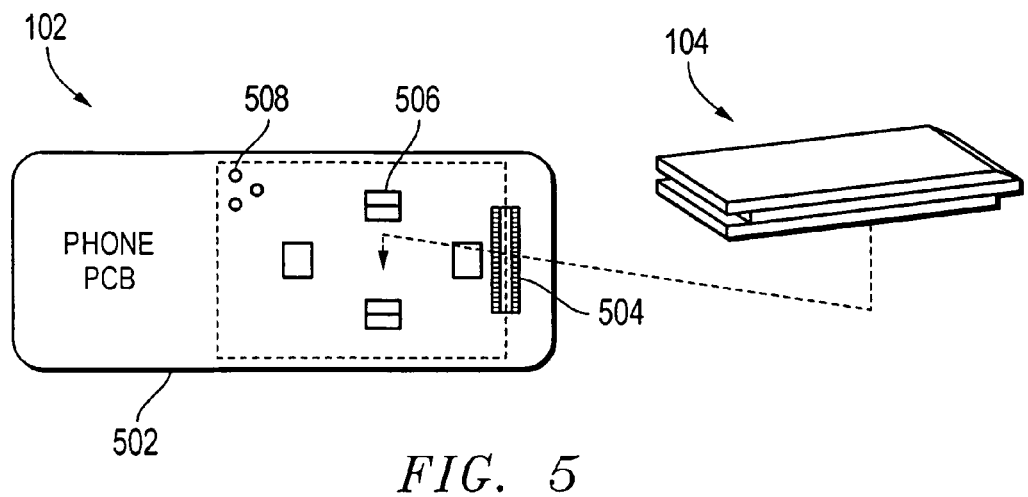
FIG. 5 illustrates a circuit board of a radio component, which circuit board provides radio functional elements and components for wireless or similar radio frequency (RF) transmissions and receptions, and which circuit board also provides connection elements via a socket for connecting a protocol module shown in the Figure to the circuit board, according to certain embodiments of the invention.

Referring to FIG. 5, the device 100 is shown in exploded functional view, to illustrate the back of a circuit board 502 of the radio component 102 and socket for acceptance of the protocol module 104. The circuit board 502 of the radio component 102 includes features corresponding to the electrical elements of the PCB 402 (shown in FIG. 4) of the protocol module 104. For example, the circuit board 502 has a connector 504, corresponding to the pin connector 404 of the PCB 402. The circuit board 502 also has ground connections 506 that can contact the ground probes 406 of the PCB 402 when the protocol module 104 is located in the socket of the radio component 102. Antenna contacts 508 are included in the circuit board 502, in location for correspondence and contact with the antenna connections 408 (attached to the PCB 402) when the protocol module 104 is in the socket of the radio component 102.

Figure 6:
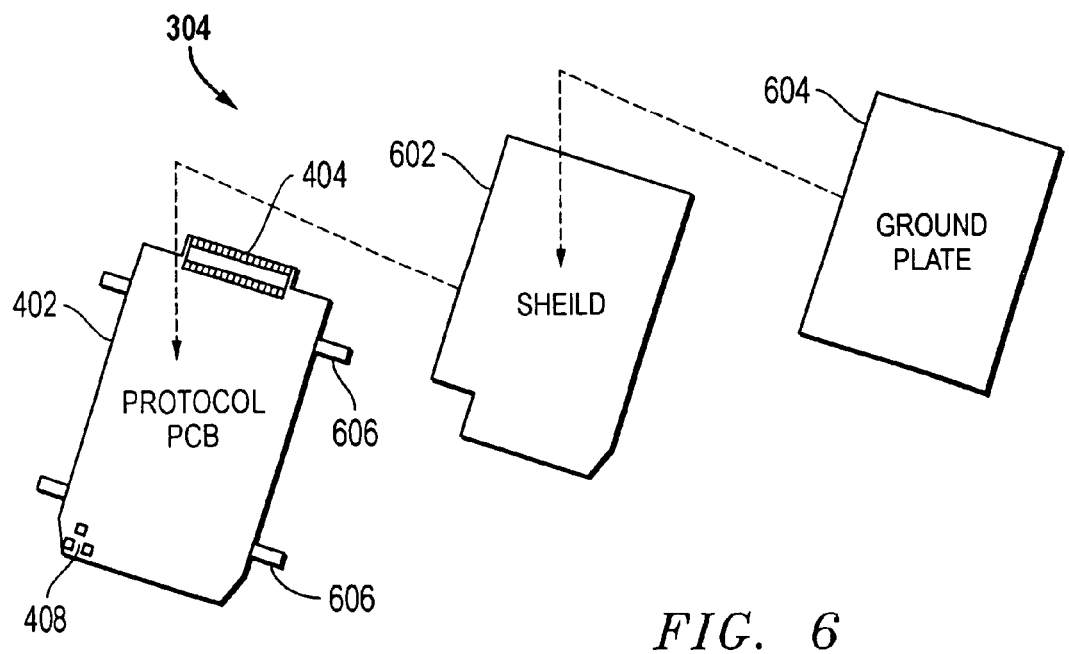
FIG. 6 illustrates an exploded, perspective view of internal elements of a protocol module, substantially like that of FIGS. 1, 2 and 3, for providing particular functions according to at least one communications system technology and protocol (e.g., either CDMA or GSM), according to certain embodiments of the invention.

Referring to FIG. 6, exploded views of internals of the protocol module 104 show the protocol module 104 without the housing 302 (shown in FIG. 3). The internals include the PCB 402. Atop the PCB 402 is fixed a shield 602. The shield 602 is a metal or other material that protects the underlying PCB 402, however, the shield 602 only selectively, if at all, contacts the PCB 402 and circuitry thereof. Atop the shield 602 is fixed a ground plate 604. The ground plate 604 is a highly conductive metal, such as copper. The ground plate 306 is selectively electrically connected to the PCB 402 to provide electrical grounding for the PCB 402. The PCB 402 includes shielding points 606 attached to the ground probes 406 (shown in FIG. 4) of the PCB 402. The shielding points 606 are formable thin metal strips. To consolidate the PCB 402, with the shield 602 thereatop, and the ground plate 604 thereatop the shield 602, each is placed over the PCB 402, and then the shielding points 606 are wrapped around the ground plate 604 to secure the pieces together. The shielding points 606 can be soldered or otherwise affixed to the ground probes 406, and also to the ground plate 604 as so wrapped therearound.

Figure 7:
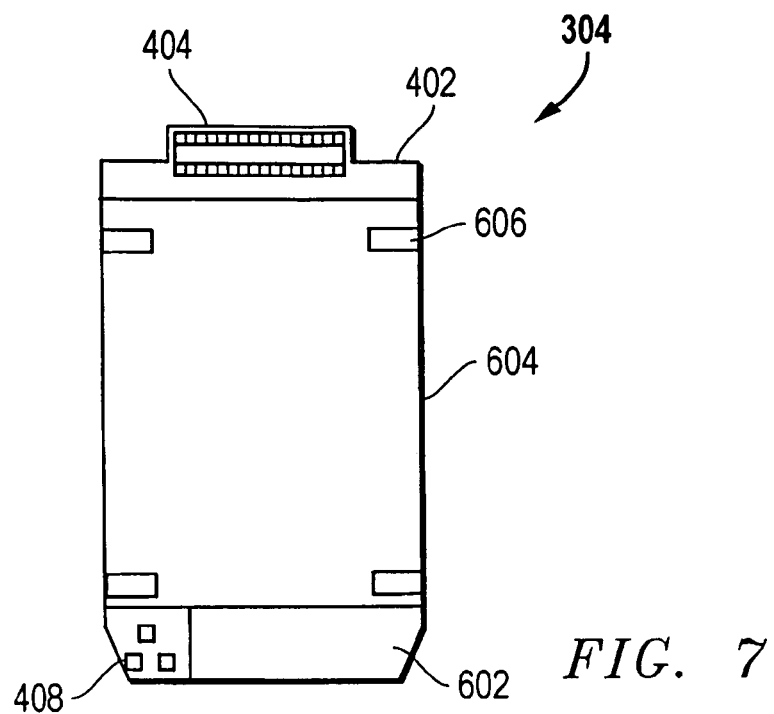
FIG. 7 illustrates a front view of the unionized internal elements of the protocol module of FIG. 6, according to certain embodiments of the invention.

Referring to FIG. 7, the internals of the protocol module 304 (as contained within the housing 302, although the housing 302 is not shown in FIG. 7) are consolidated as a unit. As so consolidated, the PCB 402 has the shield 602 protecting the circuitry of the PCB 402, and the ground plate 604 is atop the shield 602 and connects, via the shielding points 606, to the ground probes 406 of the PCB 402. The shield 602 is sized to expose the connector 404 and the antenna connections 408 of the PCB 402. The ground plate 604 is sized to also leave the connector 404 and the antenna connections 408 so exposed. The connector 404 and the antenna connections 408 remaining so exposed, are connectable to corresponding electrical elements of the radio component 102 at the socket for locating the protocol module 104.

Figure 8:
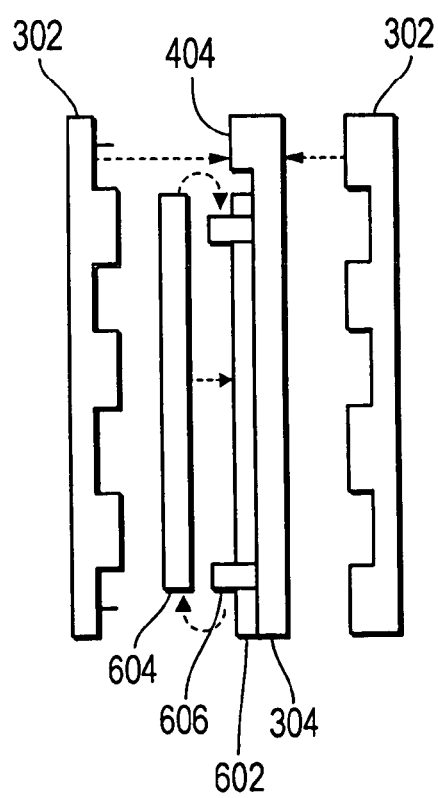
FIG. 8 illustrates an exploded, side view of the internal elements of the unit of FIG. 7 of the protocol module of FIG. 6, including a housing enclosure for the unit, according to certain embodiments of the invention.

Referring to FIG. 8, the housing 302 is two parts, and snaps in place around the unit formed of the PCB 402, the shield 602, and the ground plate 604.

Figure 9A:
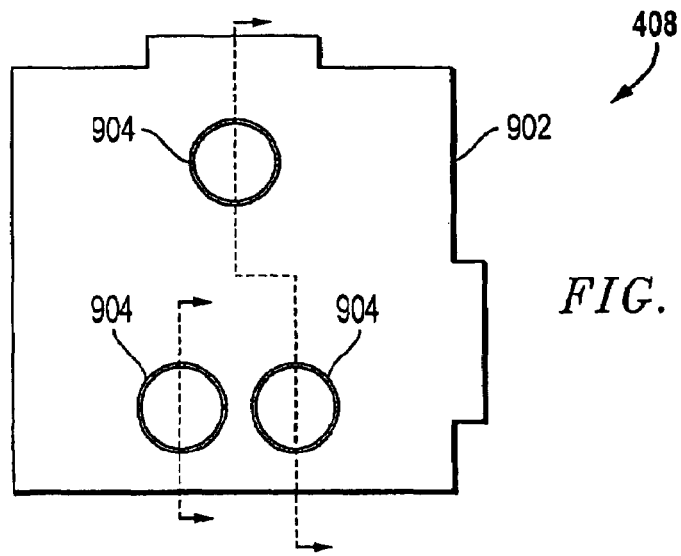
FIGS. 9a-c illustrate, respectively, a front, partial cross-section at A-A', and full cross-section at B-B', of an antenna connector of the protocol module, wherein the antenna connector is attached to the printed circuit board and enables connection of the protocol module's antenna circuitry and elements to the radio component's antenna circuitry and elements, according to certain embodiments of the invention.
Figure 9B:
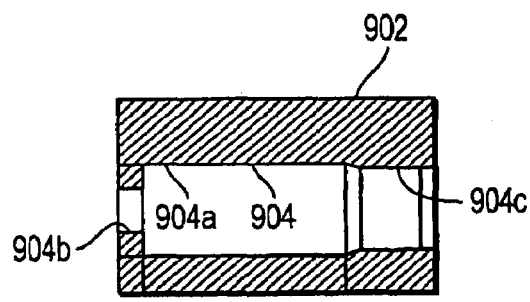
Figure 9C:
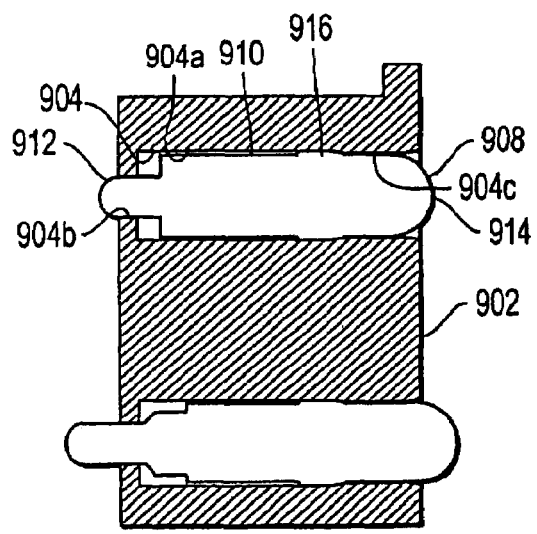

Referring to FIGS. 9a-c, the antenna connections 408 are attached to the PCB 402 and are formed of a molded case 902. The molded case 902 is formed of a conductive plastic material. The molded case 902 is attached to the PCB 402 at appropriate circuitry for antenna functions of the PCB 402.

Referring to FIG. 9a, the molded case 902 includes three probe slots 904. The molded case 902 is snappably connected to the PCB 402, for correspondence of the probe slots with applicable antenna circuitry of the radio component 102 when the protocol module 104 is placed in the socket of the radio component 104. One of the probe slots 904 is connectable to an antenna circuit of the PCB 402. The other two probe slots 904 are each connectable to an antenna ground circuit of the PCB 402.

Referring to FIG. 9b, each of the probe slots 904 is formed with a central large cylinder 904a. The central large cylinder 904a is of suitable size to accept and retain a metal probe, as hereinafter described. The probe slots 904 are each formed with a posterior smallest cylinder 904b and an upper small cylinder 904c, to present a passage completely through the case 902.

Referring to FIG. 9c, each of the probe slots 904 holds a radio frequency (RF) probe 908. The RF probe 908 has a central cylindrical portion 910 of slightly smaller outer diameter than the diameter of the central large cylinder 904a. The posterior cylindrical portion 912 of the RF probe 908 is of slightly smaller outer diameter than the diameter of the posterior smallest cylinder 904b. An upper cylindrical portion 914 of the RF probe 908 is of slightly smaller outer diameter than the diameter of the upper small cylinder 904c. The RF probe 908 at the central cylindrical portion 910 includes a ridge 916. The RF probe 908 at the posterior smallest cylinder 904b and the upper small cylinder 904c each extend outwardly from within the probe slots. Because of the shape of the probe slots 904, and the corresponding features of the RF probe 908 retained therein, the RF probe 908 is engageable, when the protocol module 104 is located in the socket of the radio component 102, to connect and keep constant contact with corresponding electrical antenna features of both the radio component 102 and the PCB 402 of the protocol module 104. The ridge 916 serves to restrict movement of the RF probe 908 within the molded case 902, in order to maintain electrical connectivity, via the RF probe 908, between the antenna connections 408 of the protocol module 104 and the appropriate corresponding antenna contacts 508 of the circuitry of the radio component 102. The RF probes 908 can be fixed with springs or other mechanisms (not shown in the Figures) to ensure fixed electrical contact between the antenna connections 408 and the antenna contacts 408, as applicable.

Figure 10:
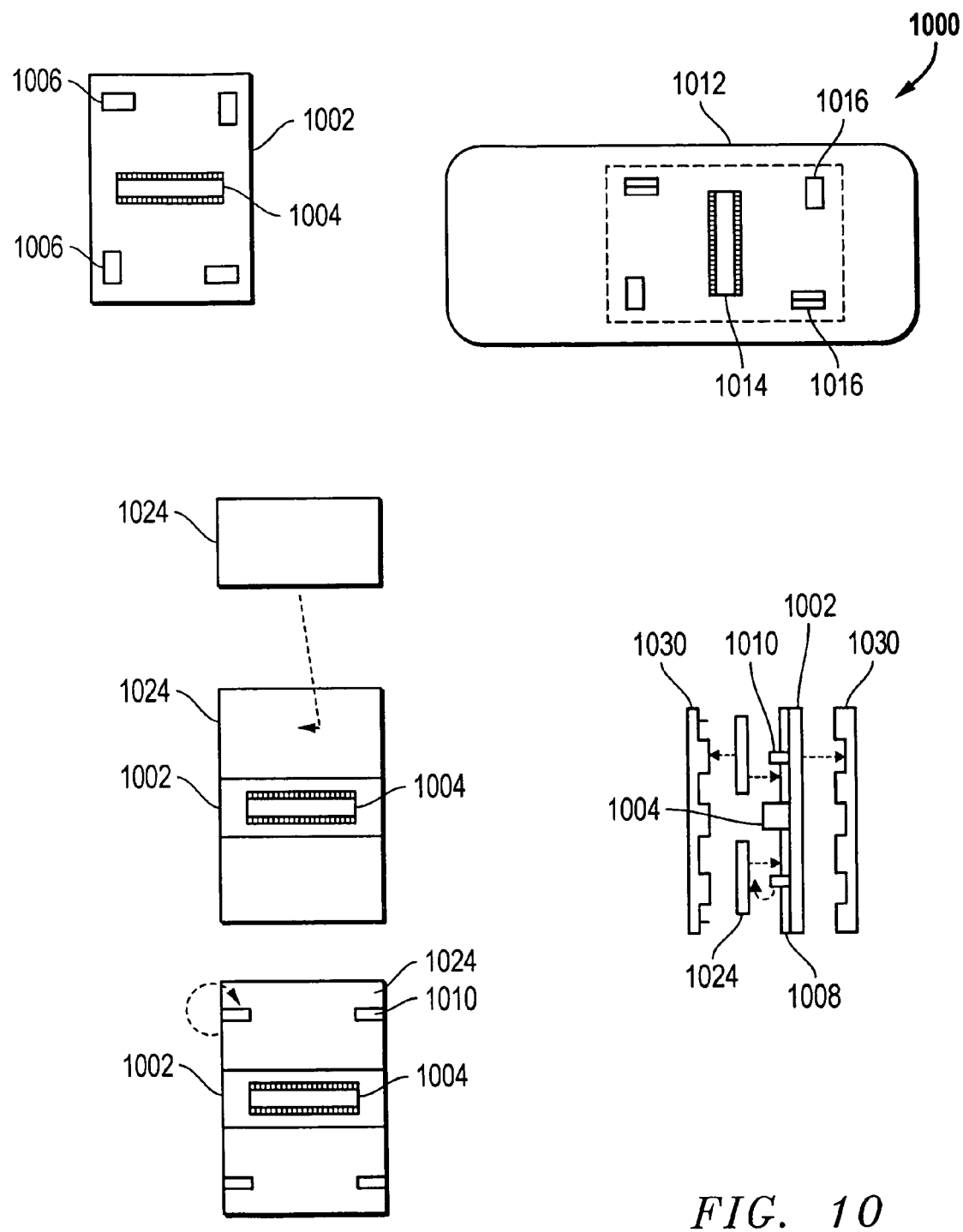
FIG. 10 illustrates an individual circuit board of an alternative protocol module, a circuit board of a radio component for use and connectivity with the alternative protocol module, and exploded and utilization of internal elements of the alternative protocol module and encasement thereof in a housing, according to certain embodiments of the invention.

Referring to FIG. 10, an alternative arrangement 1000 of a protocol module and radio component includes a PCB 1002 of the protocol module and a circuit board 1012 of the radio component. The PCB 1002 has a centrally fixed connector 1004, such as a 100 pin connector. Additionally, the PCB 1002 includes ground probes 1006. The PCB 1002, as with the PCB 304 of FIG. 4, includes circuitry and functional elements for operations according to a particular communications system protocol (e.g., either CDMA or GSM). The circuit board 1012 provides a socket for the protocol module having the PCB 1002, for example, including a centrally located connector 1014 corresponding to the connector 1004 of the PCB 1002. The circuit board 1012 also includes circuitry and functional elements for connecting the radio component to the PCB 1002 for operations as an entire, complete mobile communications device (like that of FIG. 1) according to the protocols particular for the protocol module implementation (e.g., either CDMA or GSM).

Continuing to refer to FIG. 10, the PCB 1002 has a shield (shown as 1008 in the Figure), substantially as previously described with respect to the PCB 304. Atop the shield of the PCB 304 are located dual ground plates 1024. The dual ground plates 1024 are separated atop the shield of the PCB 304, in order to allow access to the connector 1004. The PCB 1002 also includes shielding points 1010 affixed to the ground probes 1006 of the PCB 1002, and these shielding points 1010 are wrapped over the respective ones of the dual ground plates 1024 and secured, all substantially as previously discussed.

Still referring to FIG. 10, the PCB 1002 with shield 1008, has the dual ground plates 1024 in place atop the shield 1008, together with the shielding points 1010 wrapped and fixed to the respective ground plates 1024. A two-piece housing 1030 encases the PCB 1002, shield 1008 and ground plates 1024 unit, and the housing 1030 snaps together to form the complete protocol module.

Numerous variations, additions and alternatives are possible for the protocol module and the radio component. Locations of features of each can be different or changed. Moreover, added features, including other and further electrical connectors and connections, are possible in keeping with similar concepts. Of course, those skilled in the art will understand and appreciate many of the possible alternatives. In every event in the embodiments, however, an independent protocol module that is removable, insertable and replaceable in the radio component provides new and different operations of the mobile communications device for purposes of implementing in the device all past, present and future communications system protocols and technologies.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mobile device for wireless cellular communications, comprising:
    a radio, having a socket;
    a first protocol module removably connected to the socket of the radio for operating the radio according to a first wireless cellular protocol of a first wireless service provider of a first geographic locale; and
    a second protocol module removably connectable to the socket of the radio for operating the radio according to a second wireless cellular protocol of a second geographic locale;
    wherein the first wireless cellular protocol of the first wireless services provider of the first geographic locale is different from the second wireless protocol of the second wireless services provider of the second geographic locale.

2. The system of claim 1, wherein the first geographic locale is the same as the second geographic locale.

3. The system of claim 1, wherein the first wireless cellular protocol and the second wireless cellular protocol are selected from the group consisting of: CDMA, TDMA and GSM.

4. The system of claim 1, wherein the first protocol module and the second protocol module are concurrently connectable to the radio for operating the radio according to both the first wireless cellular protocol and the second wireless cellular protocol.

5. A mobile wireless cellular communications device, comprising:
    a radio for wireless cellular transmitting and receiving;
    a first self-contained, modular replaceable unit connected to the radio for controlling the radio to transmit and receive wireless cellular communications according to a first wireless cellular communications protocol; and
    a second self-contained, modular replaceable unit connectable to the radio in place of the first self-contained, modular replaceable unit, for controlling the radio to transmit and receive wireless cellular communications according to a second wireless cellular communications protocol
    wherein the radio is operable via the first self-contained, modular replaceable unit and the second unit self-contained, modular replaceable unit.

6. The device of claim 5, the wireless cellular communications of the first wireless cellular communications protocol via a first local wireless provider and of the second wireless cellular communications protocol via a second local wireless provider;
    wherein the first local wireless provider and the second local wireless provider, respectively, is selectable for the wireless cellular communications by choice, respectively, of the first self-contained, modular replaceable unit connected to the radio and of the second self-contained, modular replaceable unit connected to the radio.

7. The device of claim 5, further comprising:
    a connector of the radio for electrically connecting to the first self-contained, replaceable modular unit and the second self-contained replaceable modular unit, and permitting replacement of each with the other for controlling the radio according to the respective one of the first and second wireless cellular communications protocol; and
    an antenna of the radio for electrically connecting to the first and second self-contained replaceable modular unit.

8. The device of claim 7, further comprising:
    a connector of each of the first and second self-contained, replaceable modular unit for electrically connecting the first and second self-contained, replaceable modular unit to the connector of the radio; and
    an antenna probe of each of the first and second self contained ,replaceable modular unit for electrically connecting the first and second self contained, replaceable modular unit to the antenna connector of the radio.

9. A replaceable radio protocol module, for use with a device that includes a wireless cellular communications transmit and receive radio, comprising:
    at least one connector for electrically connecting the replaceable radio protocol module to the radio;
    wherein the replaceable radio protocol module controls the radio to operate with a first wireless cellular radio transmit and receive protocol; and
    wherein the replaceable radio protocol module is removable from connection with the radio and replaceable in connection with the radio with a different radio protocol module having the at least one connector, to control the radio to operate with a second wireless cellular radio transmit and receive protocol.

10. The radio protocol module of claim 9, further comprising:
    a radio protocol function circuit of the replaceable radio protocol module;
    wherein the radio protocol function circuit controls the radio for wireless cellular transmit and receive communications by the radio with the first wireless cellular radio transmit and receive protocol;
    wherein the radio protocol function circuit is removable and replaceable with a different radio protocol function circuit of the different radio protocol module, to control the radio for transmit and receive communications by the radio with the second wireless cellular radio transmit and receive protocol.

11. The radio protocol module of claim 10, wherein the first wireless cellular radio transmit and receive protocol and the second wireless cellular radio transmit and receive protocol are different and are selected from the group consisting of: GSM, CDMA, TDMA, and combinations.

12. The radio protocol module of claim 10, further comprising:
    a printed circuit board;
    a ground plate connected to the printed circuit board;
    a connector connected to the printed circuit board, wherein the connector is suitable to provide electrical connection of the radio protocol module to the radio; and
    an antenna connector connected to the printed circuit board, connector is suitable to provide electrical connection of the radio protocol module to the radio.

13. The radio protocol module of claim 12, wherein the printed circuit board includes the radio protocol function circuit.

14. The radio protocol module of claim 13, wherein the protocol function circuit can be interchanged with the different protocol function circuit to enable the radio to communicate, respectively, by the first and the second wireless cellular radio transmit and receive protocol.

15. The radio protocol module of claim 14, wherein the first wireless cellular radio transmit and receive protocol and the second wireless cellular radio transmit and receive protocol are different and are selected from the group consisting of: CDMA, TDMA and GSM.

16. A method of wireless cellular communications, comprising the steps of:
providing a plurality of possible modules, each for at least one of a plurality of possible distinct radio service protocols;
providing a wireless cellular transceiver radio capable of operation via the plurality of possible distinct radio service protocols on connection to one of the plurality of possible modules;
selecting a first radio service protocol for the wireless cellular transceiver radio, the first radio service protocol is at least one of the plurality of possible distinct radio service protocols;
selecting a first replaceable module from the plurality of possible modules, the first replaceable module for select operations of the wireless cellular transceiver radio in accord with the first radio service protocol from among the plurality of possible distinct radio service protocols;
connecting the first replaceable module to the wireless cellular transceiver radio to control the wireless cellular transceiver radio to transmit and receive by the first radio service protocol;
wherein the step of connecting enables operations of the wireless cellular transceiver radio to transmit and receive in accordance with the first radio service protocol.

17. The method of claim 16, further comprising the steps of:
second selecting a second radio service protocol for the wireless cellular transceiver radio, the second radio service protocol is at least one of the plurality of possible distinct radio service protocols;
selecting a second replaceable module from the plurality of possible modules, the second replaceable module for select operations of the wireless cellular transceiver radio in accord with the second radio service protocol from among the plurality of possible distinct radio service protocols;
disconnecting the first replaceable module from the wireless cellular transceiver radio;
second connecting the second replaceable module to the wireless cellular transceiver radio to control the wireless cellular transceiver radio to transmit and receive by the second radio service protocol;
wherein the step of second selecting, enables operations of the wireless cellular transceiver radio to transmit and receive in accordance with the second radio service protocol.

18. The method of claim 17, wherein the plurality of possible distinct radio service protocols is from the group consisting of: TDMA, CDMA, GSM, and at least one other another wireless cellular service protocol.

19. The method of claim 17, further comprising the steps of:
forming the wireless cellular transceiver radio suitable for selective connection and disconnection of the plurality of possible modules.

20. The method of claim 19, further comprising the steps of:
forming the first module suitable for selective connection to the wireless cellular transceiver radio; and
forming the second module suitable for selective connection to the wireless cellular transceiver radio.

21. The method of claim 19, wherein more than one of the plurality of distinct modules is concurrently connectable to the wireless cellular transceiver radio and the wireless cellular transceiver radio is concurrently enabled for operation in accordance with each of the possible distinct radio services protocols that corresponds to the more than one of the plurality of distinct modules then-connected at each instant.

22. The method of claim 16, wherein the first module is replaceable.

* * * * *